US009535752B2

(12) United States Patent
Lubsey et al.

(10) Patent No.: US 9,535,752 B2
(45) Date of Patent: *Jan. 3, 2017

(54) SYSTEMS AND METHODS OF HOST-AWARE RESOURCE MANAGEMENT INVOLVING CLUSTER-BASED RESOURCE POOLS

(71) Applicant: Virtustream IP Holding Company LLC, Bethesda, MD (US)

(72) Inventors: Vincent G. Lubsey, Snellville, GA (US); Kevin D. Reid, Bethesday, MD (US); Karl J. Simpson, Rockville, MD (US); Rodney John Rogers, Weston, FL (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 308 days.

This patent is subject to a terminal disclaimer.

(21) Appl. No.: 14/318,251

(22) Filed: Jun. 27, 2014

(65) Prior Publication Data

US 2014/0310710 A1    Oct. 16, 2014

Related U.S. Application Data

(63) Continuation-in-part of application No. 13/595,955, filed on Aug. 27, 2012, now Pat. No. 8,799,920.

(60) Provisional application No. 61/527,472, filed on Aug. 25, 2011.

(51) Int. Cl.
*G06F 9/46* (2006.01)
*G06F 9/455* (2006.01)
*G06F 9/50* (2006.01)

(52) U.S. Cl.
CPC .......... *G06F 9/5011* (2013.01); *G06F 9/5072* (2013.01); *G06F 2209/5011* (2013.01)

(58) Field of Classification Search
None
See application file for complete search history.

(56) References Cited

U.S. PATENT DOCUMENTS

| 7,194,616 | B2 | 3/2007 | Axnix |
| 7,664,110 | B1 | 2/2010 | Lovett |
| 7,908,605 | B1 | 3/2011 | Graupner |

(Continued)

FOREIGN PATENT DOCUMENTS

| CN | 1333508 | 1/2002 |
| EP | 1 170 662 | 1/2002 |

(Continued)

OTHER PUBLICATIONS

Chinese Office Action issued in CN 201180020269.0 mailed Dec. 1, 2015 with English Language Translation.

(Continued)

*Primary Examiner* — Abdullah Al Kawsar
*Assistant Examiner* — Bradley Teets
(74) *Attorney, Agent, or Firm* — Ryan, Mason & Lewis, LLP

(57) ABSTRACT

Systems and methods are disclosed for managing resources associated with cluster-based resource pool(s). According to illustrative implementations, innovations herein may include or involve one or more of best fit algorithms, infrastructure based service provision, tolerance and/or ghost processing features, dynamic management service having monitoring and/or decision process features, as well as virtual machine and resource distribution features.

4 Claims, 15 Drawing Sheets

(56) References Cited

U.S. PATENT DOCUMENTS

| | | | |
|---|---|---|---|
| 7,941,804 | B1 | 5/2011 | Herington |
| 8,234,650 | B1 | 7/2012 | Eppstein |
| 8,359,594 | B1 | 1/2013 | Davidson |
| 8,484,355 | B1 | 7/2013 | Lochhead |
| 8,555,274 | B1 | 10/2013 | Chawla |
| 2002/0059427 | A1 | 5/2002 | Tamaki |
| 2002/0161869 | A1 | 10/2002 | Griffin et al. |
| 2002/0184363 | A1 | 12/2002 | Viavant et al. |
| 2003/0028642 | A1 | 2/2003 | Agarwal |
| 2004/0003063 | A1 | 1/2004 | Ashok et al. |
| 2004/0111509 | A1 | 6/2004 | Eilam et al. |
| 2004/0267897 | A1 | 12/2004 | Hill |
| 2005/0039183 | A1 | 2/2005 | Romero |
| 2005/0102674 | A1 | 5/2005 | Tameshige |
| 2005/0108712 | A1 | 5/2005 | Goyal |
| 2005/0120160 | A1 | 6/2005 | Plouffe |
| 2005/0165925 | A1 | 7/2005 | Dan et al. |
| 2005/0235286 | A1 | 10/2005 | Ballew |
| 2006/0056618 | A1 | 3/2006 | Aggarwal |
| 2006/0069594 | A1 | 3/2006 | Yamasaki |
| 2006/0101224 | A1 | 5/2006 | Shah et al. |
| 2006/0143617 | A1 | 6/2006 | Knauerhase |
| 2006/0161988 | A1 | 7/2006 | Costea |
| 2006/0190606 | A1 | 8/2006 | Kohavi |
| 2006/0259818 | A1 | 11/2006 | Howell |
| 2007/0106796 | A1 | 5/2007 | Kudo et al. |
| 2007/0106798 | A1 | 5/2007 | Masumitsu et al. |
| 2007/0115924 | A1 | 5/2007 | Schneider |
| 2007/0118567 | A1 | 5/2007 | Isokawa |
| 2007/0250929 | A1 | 10/2007 | Herington |
| 2007/0266433 | A1 | 11/2007 | Moore |
| 2007/0271560 | A1 | 11/2007 | Wahlert |
| 2008/0082977 | A1 | 4/2008 | Araujo |
| 2008/0109549 | A1 | 5/2008 | Nakagawa et al. |
| 2008/0163194 | A1 | 7/2008 | Dias et al. |
| 2008/0163239 | A1 | 7/2008 | Sugumar |
| 2008/0183544 | A1 | 7/2008 | Matsumitsu |
| 2008/0263258 | A1 | 10/2008 | Allwell |
| 2008/0295096 | A1 | 11/2008 | Beaty |
| 2009/0012132 | A1 | 1/2009 | Nonomura |
| 2009/0138887 | A1 | 5/2009 | Uehara et al. |
| 2009/0199198 | A1 | 8/2009 | Horii |
| 2009/0254572 | A1 | 10/2009 | Redlich |
| 2009/0276771 | A1 | 11/2009 | Nickolov |
| 2009/0288084 | A1 | 11/2009 | Astete |
| 2009/0293022 | A1 | 11/2009 | Fries |
| 2010/0107172 | A1 | 4/2010 | Calinescu |
| 2010/0125845 | A1 | 5/2010 | Sugumar et al. |
| 2010/0241751 | A1 | 9/2010 | Sonoda et al. |
| 2010/0242045 | A1 | 9/2010 | Swamy |
| 2011/0093852 | A1 | 4/2011 | Li et al. |
| 2011/0119670 | A1 | 5/2011 | Sugumar et al. |
| 2011/0131335 | A1 | 6/2011 | Spaltro et al. |
| 2011/0131589 | A1 | 6/2011 | Beaty et al. |
| 2011/0173637 | A1 | 7/2011 | Brandwine |
| 2011/0185064 | A1 | 7/2011 | Head |
| 2011/0239215 | A1 | 9/2011 | Sugai |
| 2012/0110328 | A1 | 5/2012 | Pate |
| 2012/0110592 | A1 | 5/2012 | Shah et al. |
| 2012/0174097 | A1 | 7/2012 | Levin |
| 2012/0179824 | A1 | 7/2012 | Jackson |
| 2013/0042087 | A1 | 2/2013 | Shah et al. |
| 2013/0346995 | A1 | 12/2013 | Jackson |

FOREIGN PATENT DOCUMENTS

| | | |
|---|---|---|
| EP | 2040176 | 3/2009 |
| WO | WO 2009/012132 | 1/2009 |
| WO | WO 2009/072186 | 6/2009 |

OTHER PUBLICATIONS

Chinese Office Action issued in CN 201180020260.X dated Dec. 1, 2015.

Related U.S. Appl. No. 14/812,817.

English Language Abstract and Machine Translation of CN 1333508 published on Jan. 30, 2002.

Chinese Office Action issued in CN 201180020260.X dated May 19, 2016.

Chinese Office Action issued in CN 201180020260.X mailed May 15, 2015 with English Language Translation.

Chinese Office Action issued in CN 201180020260.X dated May 15, 2015.

English Language Translation for Chinese Office Action issued in CN 201180020260.X dated May 15, 2015.

Chinese Office Action issued in CN 201180020269.0 dated May 7, 2015.

English Language Translation for Chinese Office Action issued in CN 201180020269.0 dated May 7, 2015.

Supplemental European Search Report issued in EP 12826290.4 dated May 7, 2015.

International Search Report and Written Opinion issued in PCT/US2011/025392 on Jun. 2, 2011.

Related U.S. Appl. No. 12/709,954.

International Search Report issued in PCT/US2011/025390 on Jun. 1, 2011.

International Preliminary Report on Patentability and Written Opinion issued in PCT/US2011/025390 on Aug. 28, 2012.

Related U.S. Appl. No. 12/709,943.

International Search Report issued in PCT/US2011/025393 on Jun. 2, 2011.

International Preliminary Report on Patentability issued in PCT/US2011/025393 on Aug. 28, 2012.

Related U.S. Appl. No. 12/709,962.

Related U.S. Appl. No. 13/595,955.

International Search Report issued in PCT/US2012/052561 dated Feb. 7, 2013.

Written Opinion issued in PCT/US2012/052561 dated Feb. 7, 2013.

Chinese Office Action issued in CN 201180020260 dated Sep. 2, 2014.

English Language Translation of Chinese Office Action issued in CN 201180020260 dated Sep. 2, 2014.

Chinese Office Action issued in CN 201180020269.0 dated Oct. 20, 2014.

English Language Translation of Chinese Office Action issued in CN 201180020269.0 dated Oct. 20, 2014.

Chinese Office Action issued in CN 201180020127.4 dated Feb. 15, 2015.

English Language Translation of Chinese Office Action issued in CN 201180020127.4 dated Feb. 15, 2015.

Extended Search Report issued in EP 11745299.5 dated Apr. 1, 2015.

Wei Zheng et al., "JustRunIt: Experiment-Based Management of Virtualized Data Centers", USENIX, May 12, 2009, pp. 1-16.

Josef Spillner et al., "Towards Unified Service Hosting", ICSOFT (2), Jul. 29, 2009, pp. 31-36.

Tim Souder et al., "A Tool for Security Integrating Legacy Systems Into a Distributed Environment", Sixth Working Conference on Reverse Engineering: Proceedings: Oct. 6-8, 1999, Atlanta, Georgia, USA, pp. 47-55.

Extended Search Report issued in EP 11745300.1 dated Mar. 31, 2015.

Ming Zhao, "Experimental Study of Virtual Machine Migration in Support of Reservation of Cluster Resources", Virtualization Technology in Distributed Computing (VTDC), 2007 Second International Workshop on, ACM, Piscatway, NJ, USA, Nov. 12, 2007, pp. 1-8.

Timothy Wood et al., "Black-box and Grey-box Strategies for Virtual Machine Migration", NSDI '07: 4th USENIX Symposium on Network Systems Design & Implementation, Apr. 1, 2007, pp. 229-242.

Extended Search Report issued in EP 11745297.9 dated Mar. 31, 2015.

Norman Bobroff et al., "Dynamic Placement of Virtual Machines for Managing SLA Violations", 10th IFIP/IEEE International Symposium on Integrated Network Management, 2007. IM '07, May 1, 2007, pp. 119-128.

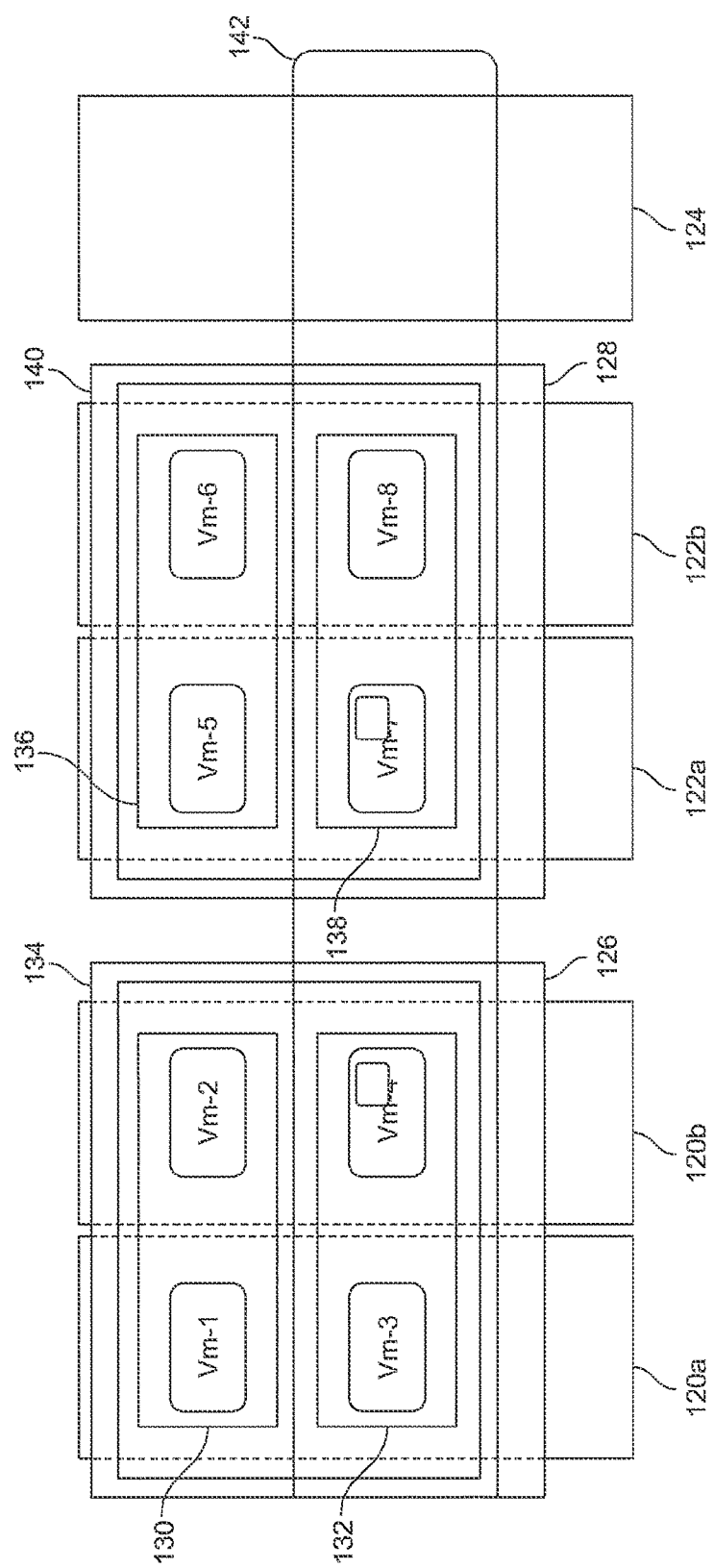

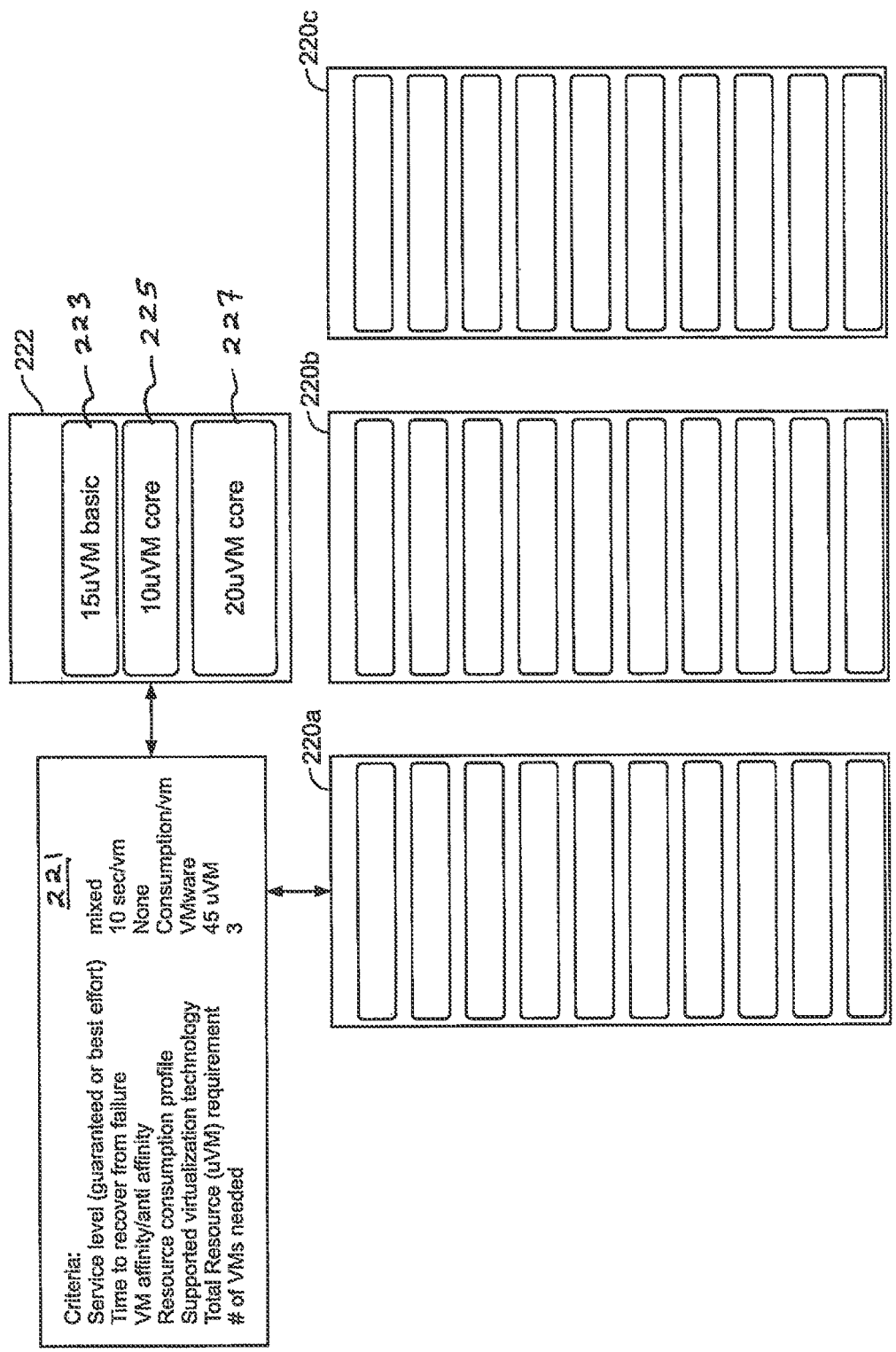

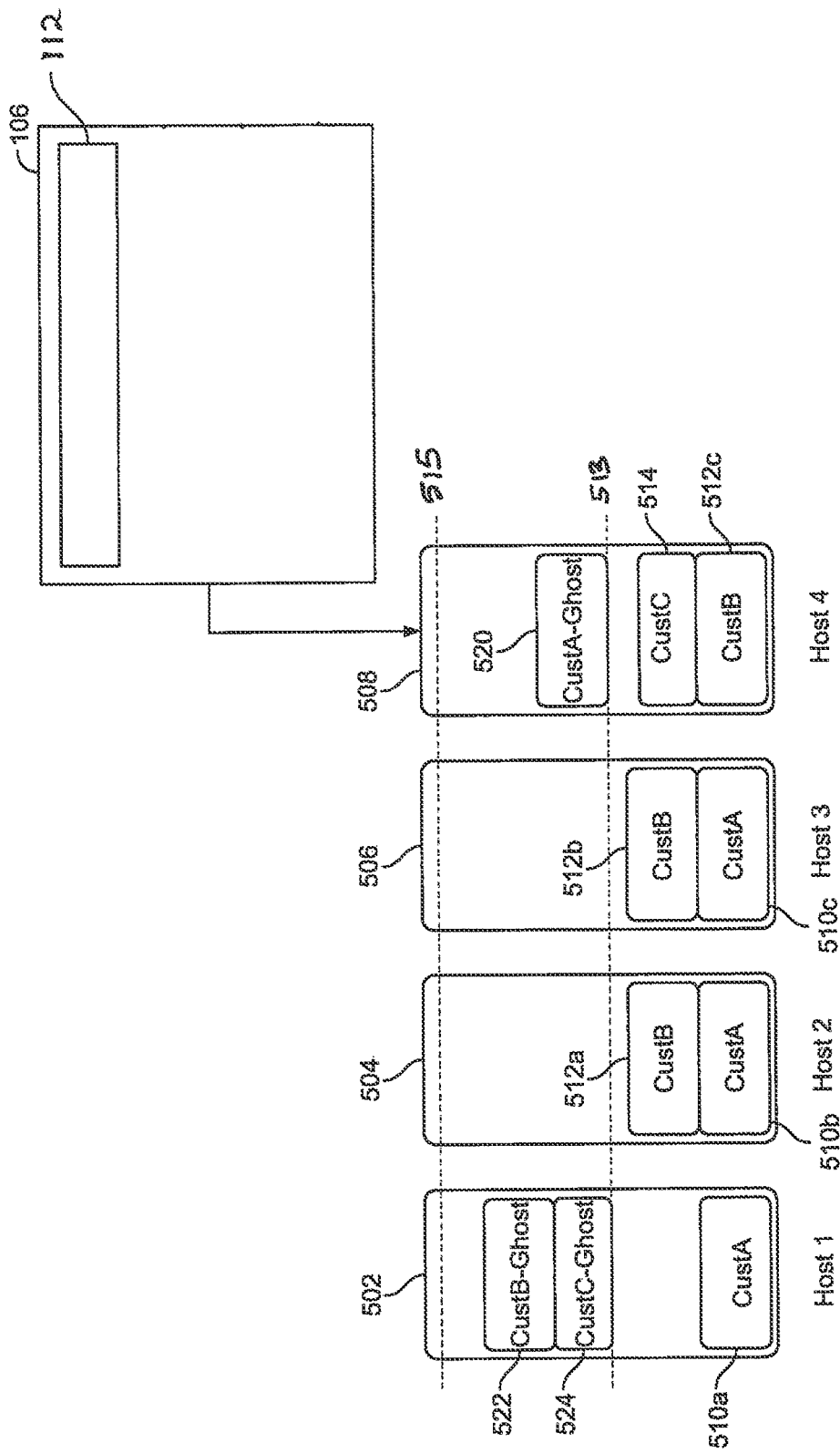

SYSTEMS AND METHODS OF HOST-AWARE RESOURCE MANAGEMENT INVOLVING CLUSTER-BASED RESOURCE POOLS

CROSS REFERENCE TO RELATED APPLICATION INFORMATION

This application is a continuation-in-part of U.S. patent application Ser. No. 13/595,955 filed Aug. 27, 2012. U.S. patent application Ser. No. 13/595,955 is based on and derives the benefit of the filing date of U.S. provisional patent application No. 61/527,472, filed Aug. 25, 2011, the contents of the entirety of which are incorporated herein by reference. Attached as an Appendix to this application is United States Published Application No. 2011-0209147, U.S. application Ser. No. 12/709,962, filed Feb. 22, 2011, the entire contents of which are also incorporated herein by reference.

BRIEF DESCRIPTION OF THE FIGURES

The accompanying drawings, which constitute a part of this specification, illustrate various implementations and aspects of the present invention and, together with the description, explain the principles of the invention. In the drawings:

FIGS. 1A-1C are block diagrams of illustrative systems and aspects of resource management associated with cluster-based resource pools according to disclosed implementations.

FIGS. 2A-2D are flow and block diagrams of illustrative processes and/or aspects of resource management according to disclosed implementations.

FIG. 5 is a diagram illustrating exemplary aspects of resource management spacing and ghost features according to a disclosed implementation.

DETAILED DESCRIPTION OF ILLUSTRATIVE IMPLEMENTATIONS

Reference will now be made in detail to the inventions herein, examples of which are illustrated in the accompanying drawings. The implementations set forth in the following description do not represent all implementations consistent with the claimed inventions. Instead, they are merely some examples consistent with certain aspects related to the present innovations. Wherever possible, the same reference numbers will be used throughout the drawings to refer to the same or like parts.

Figure 1A:
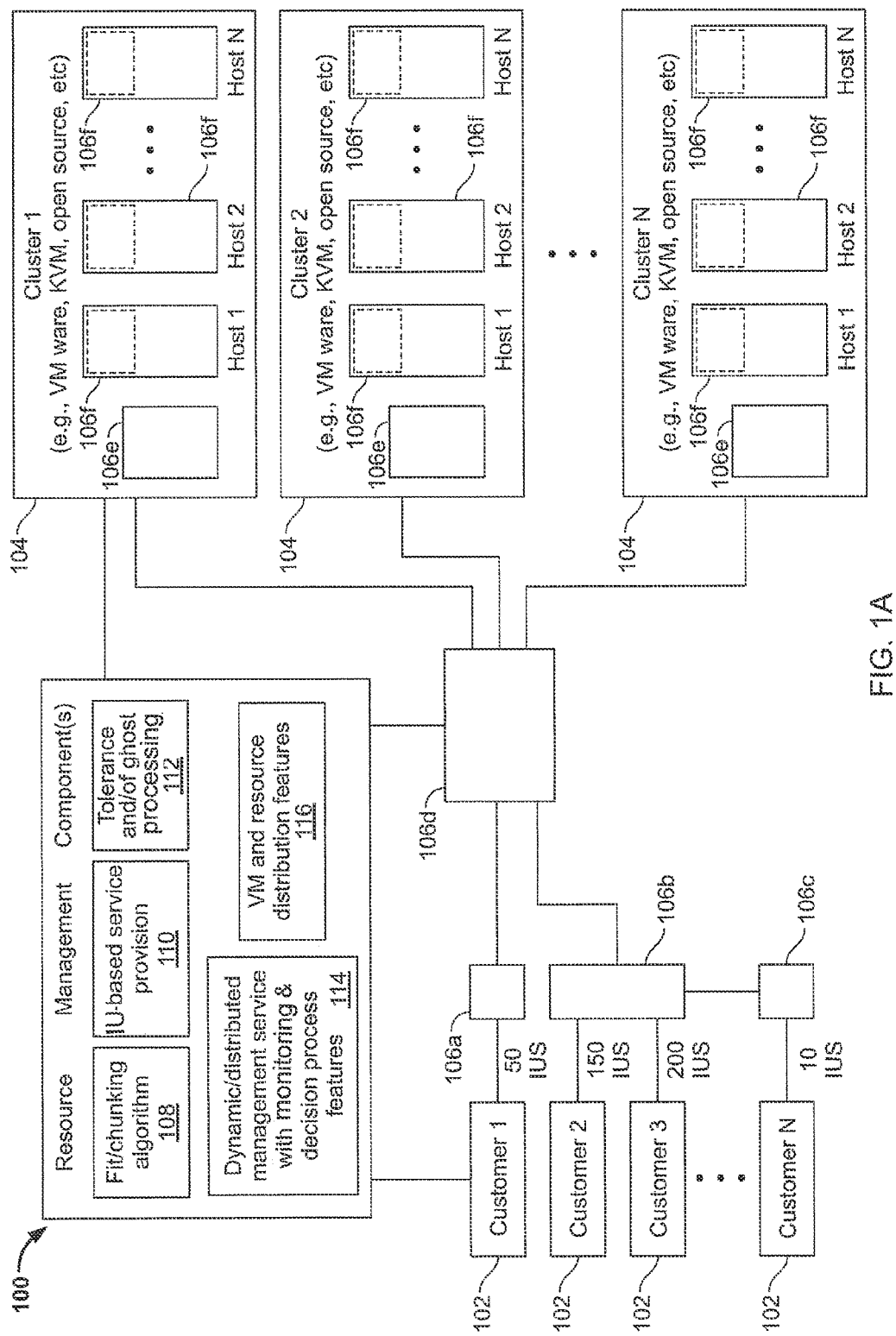
Figure 1C:
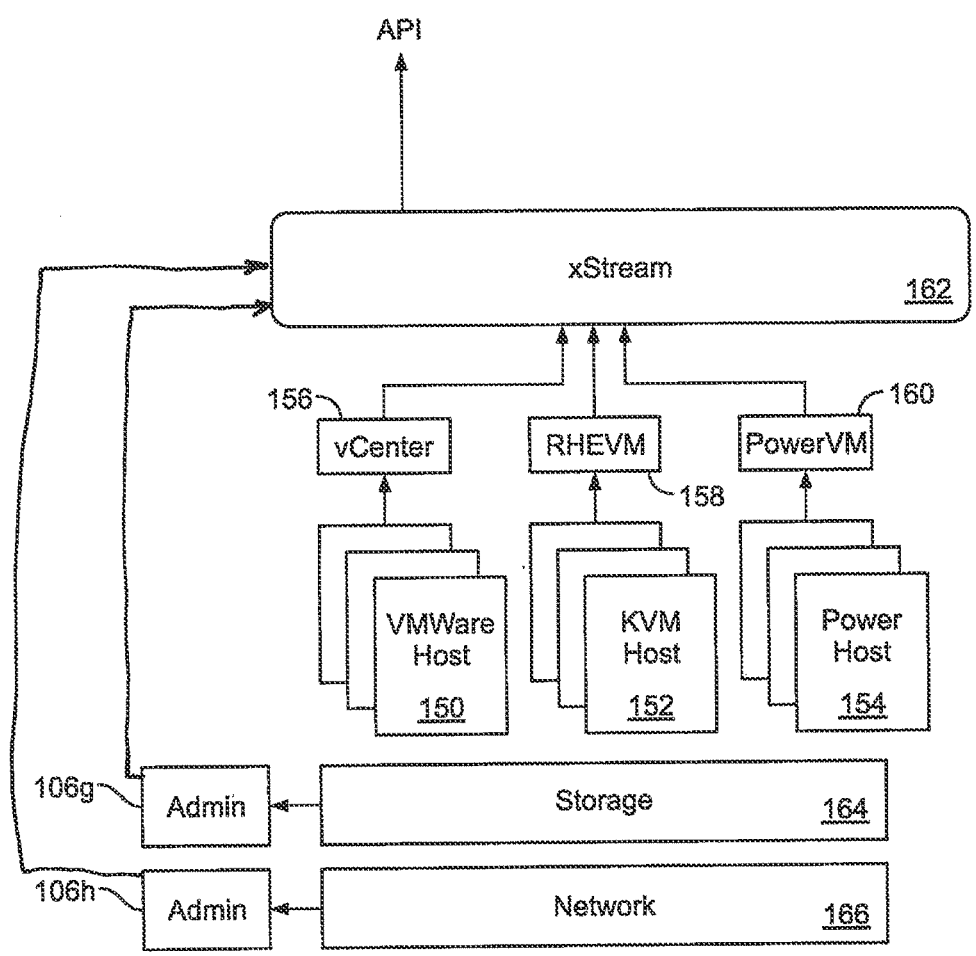

FIGS. 1A-1C are block diagrams of illustrative systems and aspects of resource management associated with cluster-based resource pools according to disclosed implementations. Here, for example, the implementations of FIGS. 1A-1C and elsewhere herein may be implemented in a cloud computing arrangement, i.e., with the various clusters physically present at differing/distributed locations throughout the cloud. Referring to FIG. 1A, a system 100 of managing resources of customers 102 across a variety of clusters 104 is shown. As set forth in more detail elsewhere, a determination of the resource needs of customers may be performed, yielding a specified quantity of infrastructure units (IUs) for each customer. As shown in illustration of FIG. 1A, for example, a first customer Customer1 may require 50 infrastructure units (IUs), a second customer Customer2 may require 150 IUs, a third customer Customer3 may require 200 IUs, a fourth customer Customer4 may require 10 IUs, and so on. A customer's infrastructure can be accessed to evaluate its cloud requirements using, for example, the Virtustream Advisor product. Customer infrastructure can also be accessed using other products to obtain, for example, capacity planner results or perform type statistics. Such assessment information may then be used to define the customer's resource pool requirements within a server farm, and resources can be apportioned appropriately.

Once defined, the customer infrastructure units may then be apportioned and otherwise managed by one or more resource management components 106. Resource management components 106 may be distributed in various different locations and/or arranged in a variety of configurations, such as those set forth herein. Here, for example, resource management processing may occur in one or more components 106a-106f set forth in FIG. 1A. The resource management may be performed via components involved with the customers 106a, 106b, 106c, via components associated with the clusters 106e, 106f, and/or via disparate components 106d. Within the clusters, resource management may occur on the hosts 106f or via other components 106e associated with the clusters. As shown in FIG. 1A, aspects of the innovations herein are configured for use across all manner of clusters 104, such as VMware clusters, kernel-based virtual machine (KVM) clusters, or other clusters of either open source or proprietary nature.

Turning to some of the illustrative resource management components in FIG. 1A, systems and methods herein may involve one or more innovative aspects such as best fit/chunking algorithms 108, IU-based service provision 110, tolerance and/or ghost processing 112, dynamic/distributed management service with monitoring and decision process features 114 and/or virtual machine (VM) and resource distribution features 116. At 108, for example, assessment information associated with customer requirements may be processed via a defined resource algorithm, such as a best fit algorithm, to define an appropriate resource pool separation or "chunking" strategy within a pool of resources. Additionally, via monitoring of such "chunks," hot spots or reallocation of resource distribution can be managed by a monitoring application portion of the dynamic/distributed management service 114 (also referred to a monitoring service or process). Resource management may also involve tolerance and/or ghost processing features 112, including definition of a customer "Ghost Chunk" to allow for resilience within the cluster, explained below.

As set forth in more detail below, various best fit/chunking algorithms 108 herein may involve obtaining or understanding a customer's resource needs as well as determining best allocations of associated virtual machines (VMs) across available clusters and hosts. To begin, basic customer resource needs may be assessed and gathered, and this process may also involve the use of known and accepted methods. According to implementations herein, customer resource requirements may then be established as a quantity of universal Infrastructure Units (IUs). Further, the scope and requirements of such IUs may be calculated as a function of analysis of clusters configured to hold customer data, wherein the analysis may include performing infrastructure speed testing and/or VM memory map sizing of hosts. Moreover, as explained below, such customer resources may then be processed through a decision method or algorithm to define the number and size of resource pools to be utilized for the customer.

Turning to FIG. 1B, an illustrative structure and interrelationship of hosts 120*a*, 120*b*, 122*a*, 122*b*, 124, cluster pools 126, 128, resource pools 134, 140, virtual pools 142 and virtual machines (VMs) is disclosed. FIG. 1B depicts a plurality of differing cluster groups, such as an ESX cluster (hosts 120*a*, 120*b*), a KVM cluster (hosts 122*a*, 122*b*) and a PVM host (124), in which cluster pools 126, 128, and resource pools 134, 140 may be defined. Virtual machines (VM-1 to VM-8) may be assigned to any of these pools and virtual pools 142 may be established or assigned across the clusters. According to the innovations herein, an appropriate resource pool separation "chunking" strategies may be implemented across a pool of hypervisors such as a pool of open source hypervisors like kernel-based virtual machine (KVM) hosts, providing a distribution of customer resources into these "chunks".

FIG. 1C depicts another illustrative implementation across a variety of disparate-technology clusters or hosts, namely a VMware cluster/host 150, a KVM cluster/host 152 and a Power-VM cluster/host 154. Each of these clusters/hosts is then coupled via their respective connectivity component 156, 158, 160, to the processing component or components associated with customer resource management/delivery 162 (also referred to as "xStream"). The xStream processing component or components may correspond, in whole or in part, to elements 106 discussed elsewhere herein. The processing component or components 162 may also be coupled via various other resource management components 106*g*, 106*h* to storage 164 and network 166 facilities. Together, all of these elements may interact as a result of instructions associated with the overall resource management functionality 106 to achieve the innovations herein. Here, for example, the information from the hypervisors/blocks 156, 158, 160, storage 164 and networking 166 infrastructure may be aggregated into xStream 162 in order to determine the IUs available and/or the location(s) to place new workloads. Such implementations may also include a connection to a service management system which contains all of the associated service level limits, if not stored within xStream 162. However, it should be noted that the structure/relationships shown in FIG. 1C are but one illustrative implementation. The xStream 162 and/or processing components 106 herein may be connected, inter alia, to disparate hypervisors and/or have other arrangements, and it is noted that the innovations herein are not limited to any such single representation in the drawings.

Figure 2A:
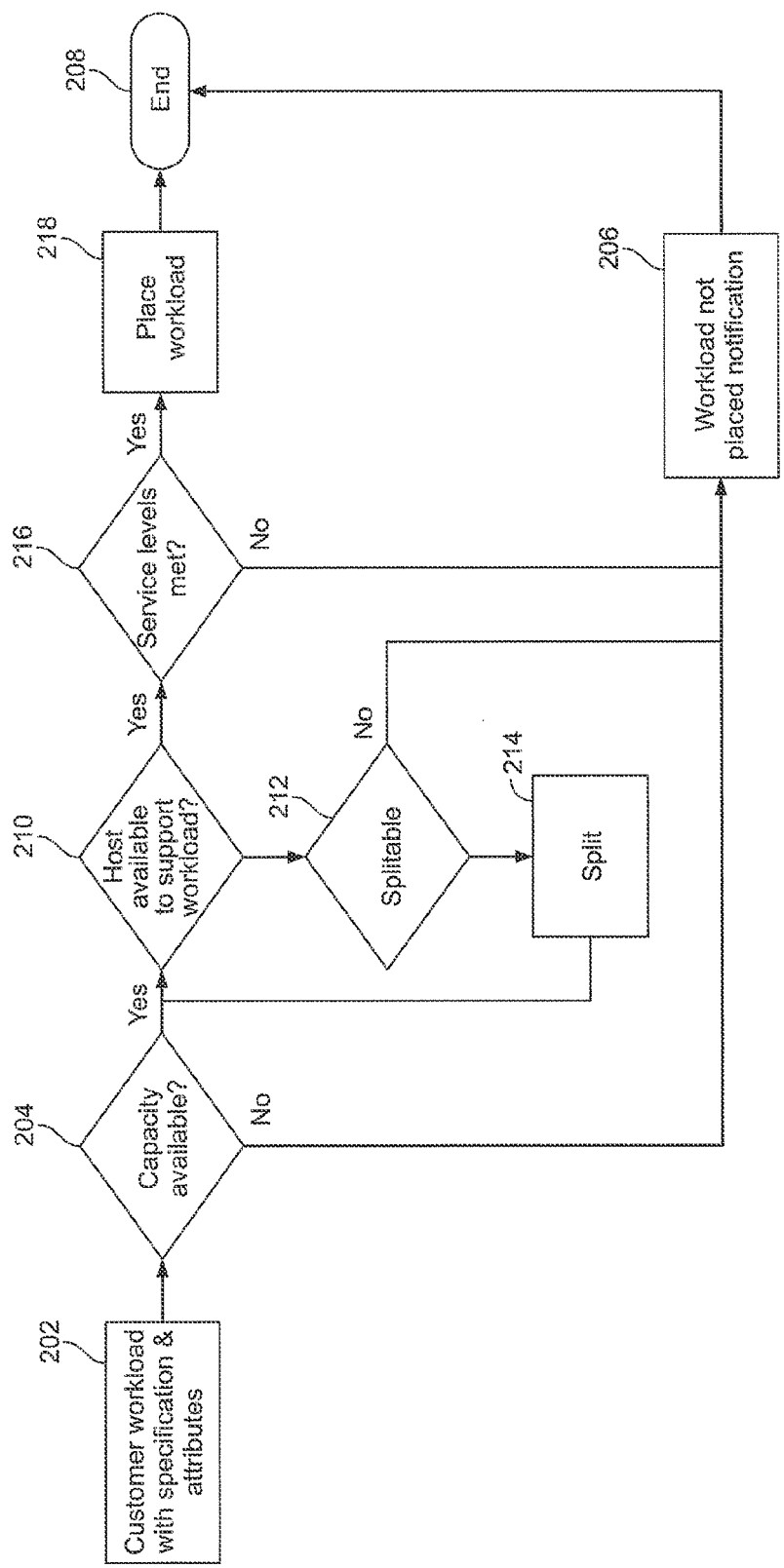
Figure 2C:
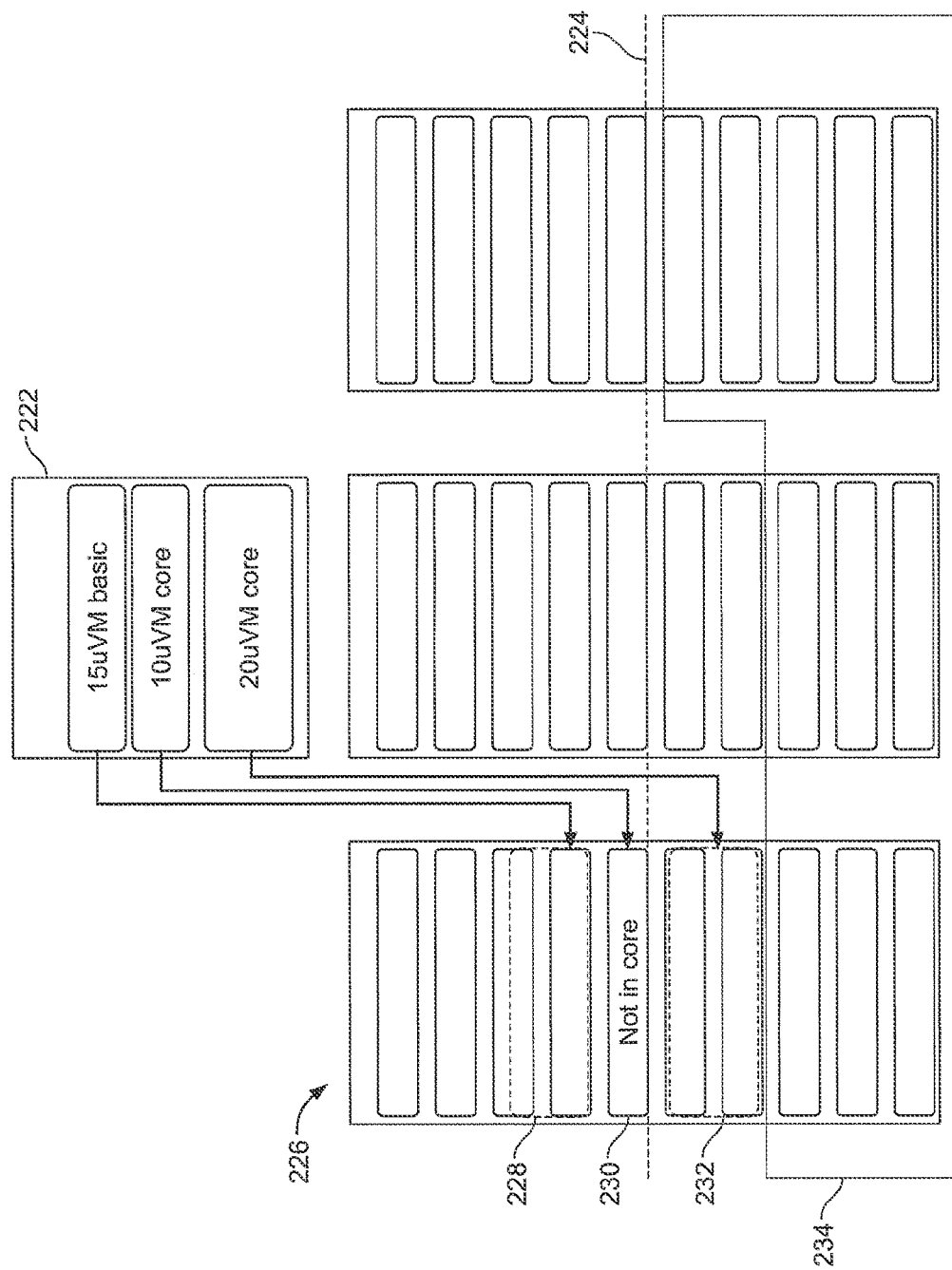

FIGS. 2A-2C are flow and block diagrams of illustrative processes, algorithms and/or aspects of resource management according to disclosed implementations. Here, for example, such methods or algorithms may define, based on set criteria, a best fit number of chunks for a customer's resource requirement or resource pool allocation. This set of criteria can include, for example, the number of resource units used as well as the number of virtual machines (VMs) that the customer has and the VM/unit ratio. Referring to the high-level algorithm of FIG. 2A, customer workload information is first generated or obtained, at 202, including specifications and attributes such as the VM and VM ratio information. Next, a determination is made if capacity is available across the cluster-based resources to handle the workload, at 204. If sufficient capacity does not exist, a notification is generated, at 206, indicated that the workload cannot be placed, and the algorithm ends 208. If, at 204, the capacity determination processes establishes that sufficient capacity to handle the workload exists, processing proceeds to a second determination step. Here, at 210, a determination is made as to whether a host is available to support the workload. If not, the algorithm then determines whether the workload is splitable, at 212. If the workload is not splitable, a notification is issued that the workload is not placed, at 206, and the algorithm ends. If the workload is determined to be splitable, the workload is then split, at 214, and the subdivided portions of the original workload are processed through the second determination step 210. If, at 210, the algorithm confirms that a host is available to support the workload, a verification process is then performed, at 216, to verify whether necessary service levels can be met via placement on the host. If the service levels cannot be met, a notification is issued that the workload is not placed, at 206, and the algorithm ends. If the service levels can be met, the workload is placed on the host(s), at 218, and the algorithm ends 208.

More detailed examples of such methods and algorithms are discussed below in connection with FIGS. 4A-4B, with these illustrations using a defined maximum number of virtual machines per resource chunk value of "10." Note that the term "resource chunk" is also referred to herein as "resource pool". This value of the maximum number of virtual machines per resource chunk reflects a quantity of virtual machines set to ensure an appropriate speed for high availability (HA) restart or maintenance migration. This value may be calculated, for example, after infrastructure speed testing and VM memory map sizing, and may be determined to fit the following calculation:

$$\frac{\text{Acceptable "outage" time (based on infrastructure guarantees)}}{\text{migration or } HA \text{ timer per } VM} \geq VM \text{ per chunk}$$

Here, for example, given an acceptable outage window of 60 seconds and a high availability (HA) time per VM of 10 seconds, then implementations herein may proceed with the value of 6 (60/10) or fewer VM's per chunk.

FIG. 2B is a block diagram illustrating various hosts 220*a*, 220*b*, 220*c*, a set of basic resource information for a customer 222 as well as a listing of more detailed resource environment/criteria 221 associated with the customer. In the example of FIG. 2B, the basic customer resource information 222 includes a customer virtual machine (VM) 227 value of 20 uVMs (or IUs), a customer workload 225 value of 10 uVMs, and a basic (non core) set of VMs or IUs 223 having a value of 15 uVMs. Turning to the general environment and requirements 221, including associated customer criteria, e.g., before a placement decision is made, we see that the total customer resource requirement is the sum of these 3 values, or 45 uVMs. With regard to additional criteria for this customer as shown in FIG. 2B, a mixed service level (both guaranteed and best effort) is required, time to recovery from failure is 10 sec/VM, there is no VM affinity or anti affinity, the resource consumption profile is consumption/VM, supported virtualization technology is WMware, and the quantity of VMs needed is three. Though not shown in FIG. 2B, "VM affinity" requirements may include such features as the need to run certain VMs in the same host to reduce network utilization/traffic/latency between the VMs. The resource consumption profile may be a model that defines the past resource consumption and expected resource consumption. In general, customer workload is defined with certain attributes that will be used for placement. As illustrated in connection with FIGS. 2C-2D, a goal of implementations herein is to determine the placement of the workload within the cluster based on the defined criteria (constraints).

Figure 2D:
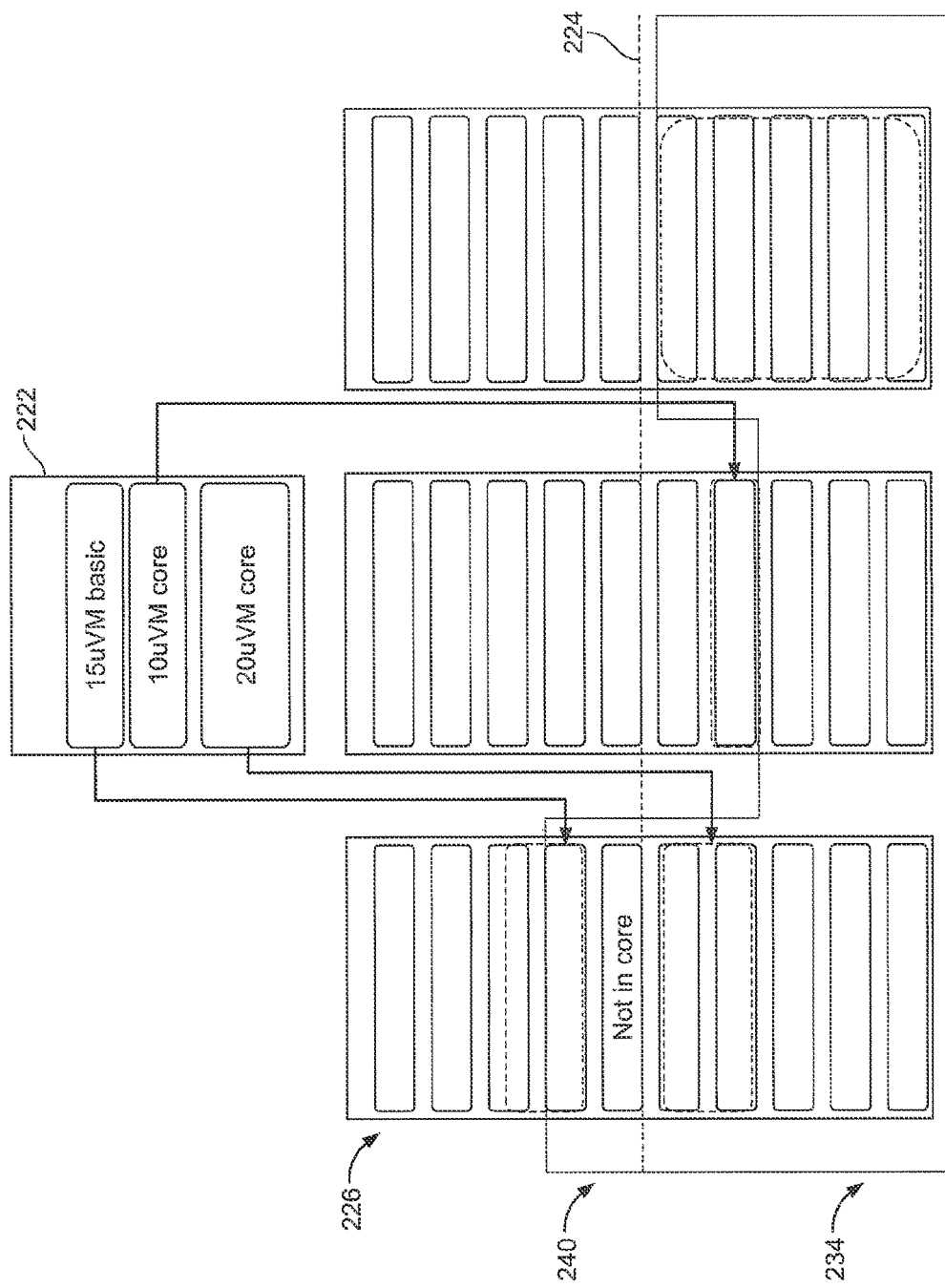

Turning to FIG. 2C, the same exemplary customer resource components are shown above, at 222, as well as 3 hosts down below with a line 224 delineating the core (guaranteed) threshold level for the cluster, with guaranteed resources placed below the threshold line 224. Here, there is insufficient room for both the 10 uVM and 20 uVM portions in the first host 226 since these are both designated as requiring placement in the core (guaranteed) service region. Accordingly, placement does not occur, as migration to the first host would exceed host level for guaranteed resources. Additionally, recovery time limits must be supported for the customer's workload as well as the workload for other customers running on the host. In this case, the 10 uVM workload would not meet service level requirement and thus needs to be placed on a different cluster. FIG. 2D illustrates how such a VM portion may be moved to a second host within a cluster, e.g., in order to satisfy resource guarantees. Additionally, a new resource pool 240 encompassing both hosts may be established for such incoming customer. Here, the constructed pool may be used to enforce quotas for resource consumption and policy.

Figure 3:
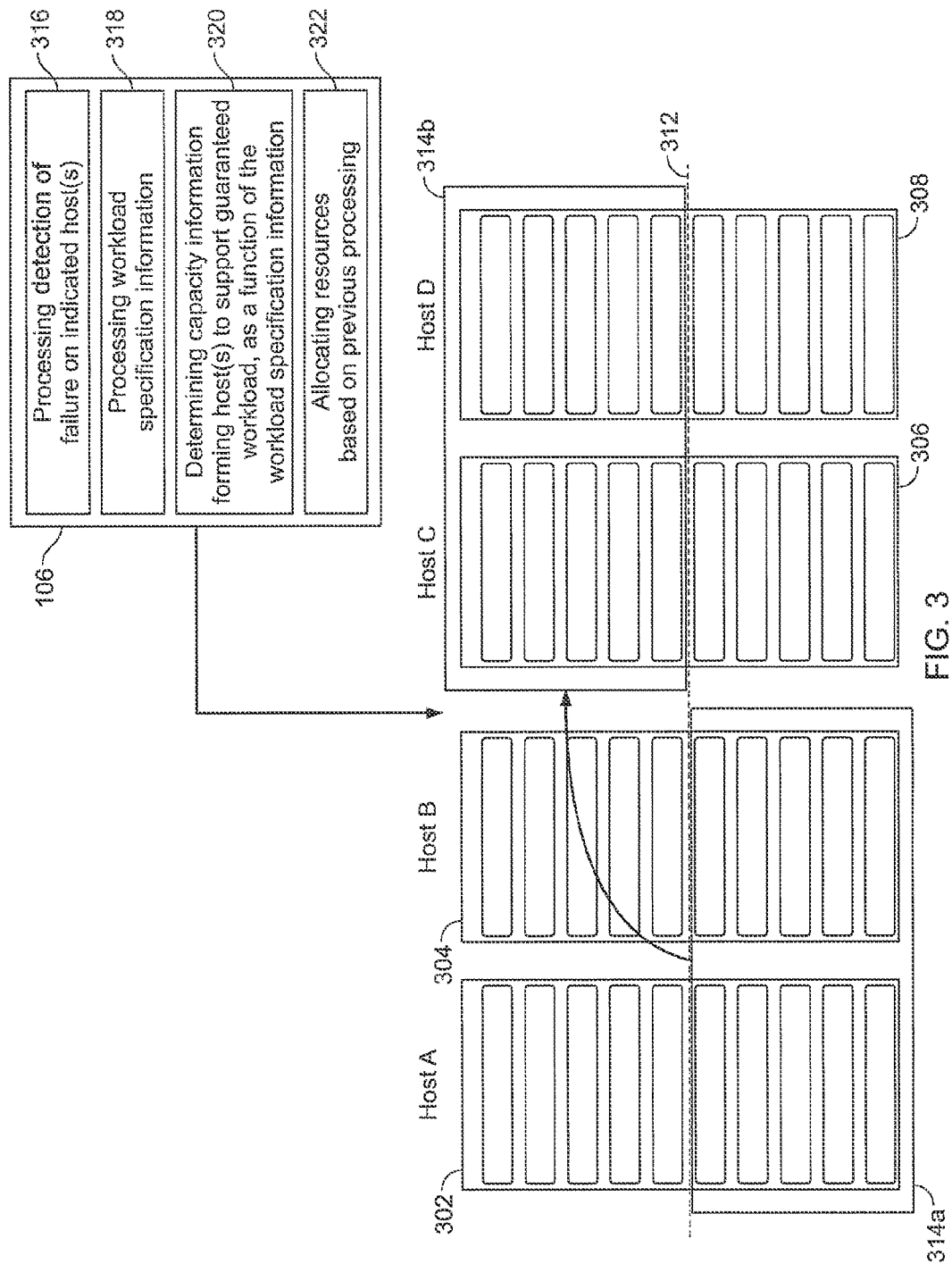
FIG. 3 is a diagram illustrating exemplary aspects of resource management service provision according to a disclosed implementation.

FIG. 3 is a diagram illustrating exemplary aspects of resource management service provision according to a disclosed implementation. Here, for example, resources in the data center may be managed so that VMs/workloads running on hosts with a guaranteed service level can be supported on other hosts in the event of a failure. Referring to FIG. 3, in the event of a failure on hosts A and B, a guaranteed workload 314a can be supported via migration to resource location(s) 314b on the remaining hosts C and D. Note that the term "resource units" is also referred herein to as "infrastructure units" (IU) or data center units. In some embodiments, the hardware resources (and accompanying software) of a data center (or a pool of servers, or a pool of VM hosts) can be partitioned so that the hardware (and/or software) resources of the data center units are guaranteed to perform at predefined resource limit values. In other words, the resources of the data center units can be managed, e.g. via one or more resource management components 106, so that they provide guaranteed levels of service that correspond with each (or every) predefined resource limit value from a set of predefined resource limit values.

Here, for example, an illustrative resource management component 106 process may include processing detection of a failure on indicated host(s) 316, processing the workload specification information for the workload(s) to be migrated off of the failed host(s) 318, as a function of the workload specification information, determining capacity information of remaining hosts to support guaranteed workload 320, and migrating resources from the failed host(s) as a function of this determination process 322. Here, for example, the host capacity to support the guarantees may be statistically determined based on the workload specification for quantity of VMs, VMs per host, service level, VM affinity, and/or supported virtualization level(s), as also described elsewhere herein.

Figure 4A:
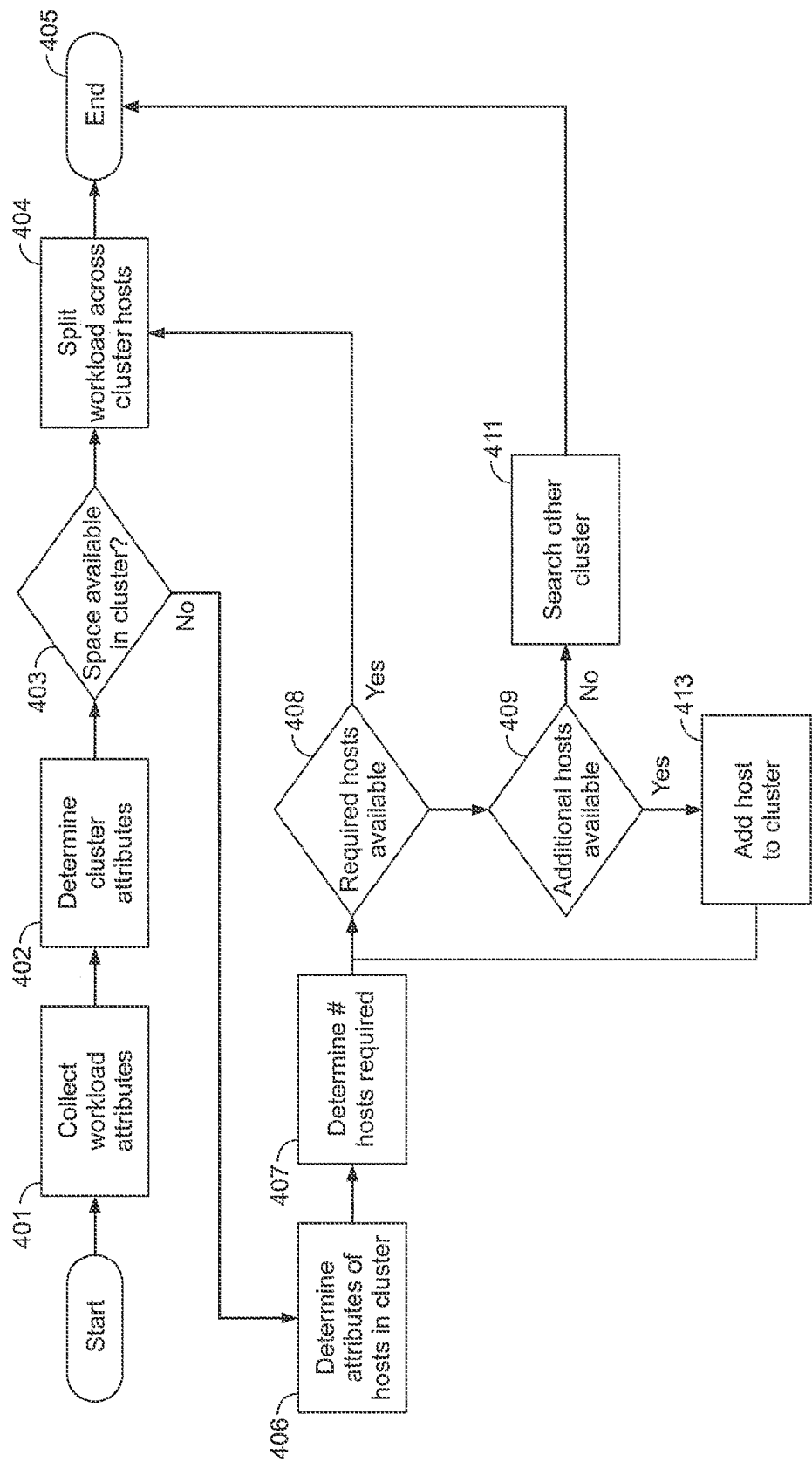
FIGS. 4A-4B are flow diagrams showing illustrative processes and/or aspects of best fit resource management processing according to disclosed implementations.
Figure 4B:
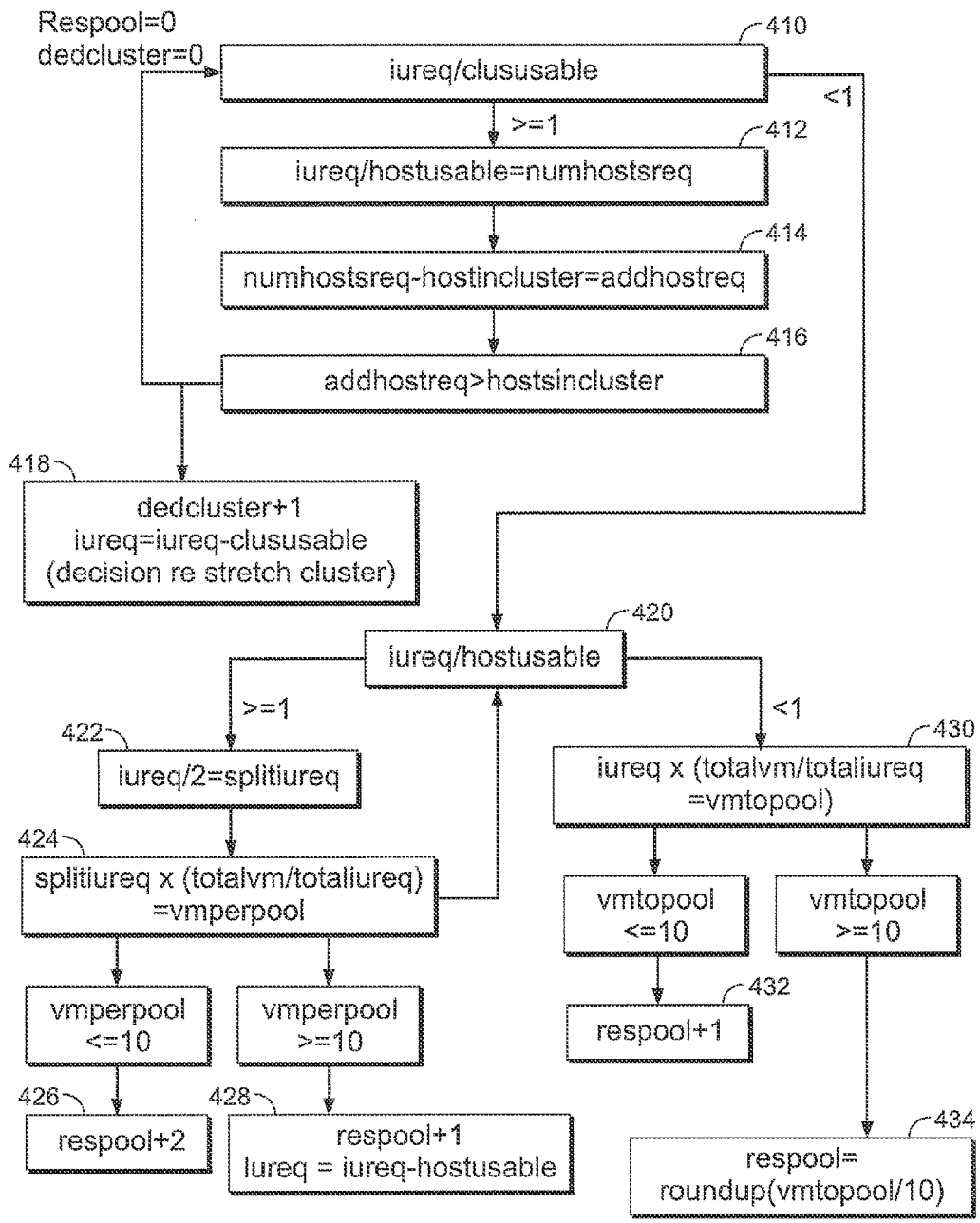

FIGS. 4A-4B are flow diagrams showing illustrative processes and/or aspects of best fit resource management processing according to disclosed implementations. In a first implementation shown in FIG. 4A, an illustrative process may begin by collecting or obtaining workload attributes 401 as well as determining or processing cluster attributes 402. Next, at 403, a determination may be made as to whether space in the cluster is available for the workload. If space is available, the workload is split, at 404, across hosts in the cluster, and the algorithm ends 405. If however, at 403, space is not available in the cluster, the algorithm proceeds to a step of determining attributes of hosts in the cluster, at 406. In conjunction, the algorithm next determines the quantity of hosts required, at 407, and then determines if this quantity of hosts are available on the present cluster, at 408. If such quantity of hosts is available, the algorithm proceeds to split the workload across the cluster hosts, at 404, and ends. If however, at 408, a determination is made that the hosts required are not available, a search for additional hosts is performed, at 409. Here, if additional hosts are located, such hosts are added to the cluster, at 413, and the algorithm proceeds back to step 408. However, at 409, if no additional hosts are available, the algorithm proceeds to search for available space on other clusters, at 411, and ends.

Referring to the implementation of FIG. 4B, the illustrative algorithm may begin with a respool (resource pool) value of 0 and a decluster (dedicated cluster) value of 0. This example of the method or algorithm above assumes a maximum of 10 VM's may be employed in a resource pool or chunk. The algorithm may begin with a first processing phase, at 410, wherein if IUreq (number of IU required) divided by clususable (number of cluster usable IU) is greater than or equal to 1, then a sufficient requirement exists to dedicate at least one cluster of resource to a customer and the method proceeds to 412. At 412, IUreq divided by hostusable (number of host usable IU) is calculated to produce numhostsreq (number of hosts required). Then, at 414, numhostreq minus hostincluster (number of hosts in cluster) is calculated to produce addhostreq (additional hosts required). Next, at 416, if addhostreq>hostincluster, a decision is made regarding whether to continue to iterate through additional clusters or whether to define a bespoke "stretched" cluster. If the decision is to define a bespoke "stretched" cluster, then at 418 dedcluster is incremented by 1 and the value of iureq is reduced by clususable; and the value of iureq is now tested again through another iteration starting back at 410.

If, at 410, IUreq divided by clususable is less than 1, then the customer's requirement will fit inside a single cluster and the method proceeds to a second processing phase, beginning at 420. Here, at 420, if IUreq divided by hostusable is greater than or equal to 1, then a sufficient requirement exists to place the requirement across more than one host and the method proceeds to 422. At 422, IUreq is divided by 2 to produce splitIUreq (split IU requirement). The algorithm then proceeds to 424, where splitIUreq is multiplied by totalvm (total number of VM's) divided by totalIUreq (total IU requirement) to produce vmperpool (a number of VMs per pool). If vmperpool is less than or equal to the defined chunk value (10 VMs in this example), then the algorithm proceeds to 426, where respool is incremented by 2 (splitIUreq) and the algorithm ends. If, at 424, vmperpool is determined to be greater than the defined chunk value (i.e., 10 VMs), then the algorithm proceeds to 428, where the VM's respool is incremented by 1 and IUreq is recalculated to be IUreq minus hostusable; this value of IUreq is then sent back to the first step of the second processing phase for reevaluation at 420.

If, at 420, IUreq divided by hostusable is less than 1, then the required resource will fit inside a single host and the method proceeds to a third processing phase, at 430. There, at 430, IUreq is multiplied by totalvm/totalIUreq to produce a vmtopool (VM to resource pool) value. If a determination is made at 430 that vmtopool is less than or equal to the chunk value (i.e., 10 VMs), then the algorithm proceeds to 432, where the value of resource pool (i.e., the VM's respool) is incremented by 1 and the method ends (i.e., the algorithm exits). If vmtopool is greater than the chunk value (i.e., 10 VMs), then at 434 respool is calculated by rounding up the results of dividing the number of VMs by the defined chunk value (i.e., 10 VMs limit) and the method ends (i.e., the algorithm exits).

After the method has been performed, a number of appropriate resource pools for the customer is identified. The sizes of these resource pools should be equal to any relevant "Ghost" pool for a customer, as explained below, and should be the size of the largest individual pool. In some implementations, the size of the largest individual pool may be calculated based on:

Totaliureq/respool=respool size

If a scenario exists where one or more virtual machines would not be able to fit inside a single resource pool, then additional calculation may be performed. Such calculation(s) and decision processing may also be included within the method or algorithm. Moreover, once defined, the resource pools can then be distributed throughout the cluster usable space, with unused (except in node tolerance events) tolerance ghost pools or "ghosts" defined on any host not containing a live pool. In the event that a customer has resource pools on all hosts in a cluster, then ghost pools may be defined on multiple hosts.

FIG. 5 is a diagram illustrating exemplary aspects of resource management spacing and ghost features according to a disclosed implementation. Referring to the illustrative implementation of FIG. 5, the resource clusters and hosts 502, 504, 506, 508 are configured with highwater marks to accomplish site and cluster tolerance innovations. These highwater marks are represented by the first line 513 between the "Usable" space and the "Tolerance" space, and the second line 515 between the "Tolerance" space and the "Host" space. Customer A 510 ("CustA") exists on hosts 1-3 so the "Ghost" for Customer A 520 is defined on host 4. Customer B 512 ("CustB") exists on hosts 2-4, and hence has its ghost 522 defined on host 1. Customer C 514 ("CustC") exists on only host 4. As such, the "Ghost" for Customer C 524 may be defined on any of hosts 1-3. By defining ghost pools or ghost chunks in this manner, implementations herein may achieve further resilience within the cluster, such as n+1 resilience, via provision of the customer resources on an additional host from which access, migration or recovery may occur.

In further implementations of the systems and methods herein, ghost pools may be used during maintenance windows or node tolerance events. Upon resumption of normal service, VM's may be migrated back to originating pools. Allocating pools and failover in this fashion has a number of benefits:

VM's are placed together, thereby leveraging faster communication, and resulting in a more expected set of communication paths (e.g., firewalls can be defined on a few hosts rather than all)

maintenance windows only need to account for affected location hosts rather than the entire cluster. In FIG. 5, for example, CustA has a maintenance window that is affected by maintenance to Hosts 1-3, but not Host 4; CustB has a maintenance window that is affected by maintenance to Hosts 2-4, but not Host 1; and CustC has a maintenance window that is affected by maintenance of Host 4, but not Hosts 1-3 constraints remain in place even with loss of management service While some of the above disclosure relates, at least in part, to the initial placement of customer resources, implementations described herein also provide the ability to dynamically shift workloads and appropriate additional resource. A management service (or process or application), such as 114 in FIG. 1A, may be provided for monitoring and management of the workloads within the cluster. This management service may be configured in a number of ways. For example, such management service can be configured to respond to highwatermark "alerts" from the Cgroups (control groups) and/or process migration instructions related thereto. Migration to a Cgroup may be based on the historical and expected usage profile. Further, as set forth elsewhere herein, in cases where the workload is assessed to remain where it is, the current Cgroup may be expanded to provide more resources.

The management service may also be configured to query the Cgroups for performance information relating to the group and the VM's running within it. Further, it may be configured to initiate a migration of a VM based on its workload to an alternative Cgroup. This may be done to provide room for a "busy" service within its originating Cgroup. For example, if the quantity of pools at high water mark is less than the total quantity of pools, then functions such as defining free space in lower watermark pools, defining "best fit VM's" and vMotion may be performed. Here, vMotion may be the migration of a VM from one host to another while the machine continues to run and accept new requests. For example, the VMs may be migrated from one pool on one host to another. Overall, the management service may also perform migration to a Cgroup with sufficient "free" space to run its task.

Further, the management service may be configured to dynamically alter Cgroup limits to provide "burst" features, such as expanding the Cgroup limit over a particular timeframe or in other limited circumstances such as with regard to temporal requirement or conditions. Here, for example, if the quantity of pools at high watermark equals the total quantity of pools then the management service may be configured to dynamically increase cgroups size across the board and/or burst into ghost via vMotion. Additionally, the management service may also be configured to define and destroy a Cgroup to provide "timed access" to a system (e.g., end of month payroll, etc). Here, for example, the service may schedule a resource allocation to a zeroed Cgroup then re-zero at end of its allocated time. Such processing may be performed provided the cluster has unallocated resources pools available (e.g., state is n>n−1) and no site tolerance issues are present, then it would be acceptable to use unallocated resource pools for these tasks.

Figure 6:
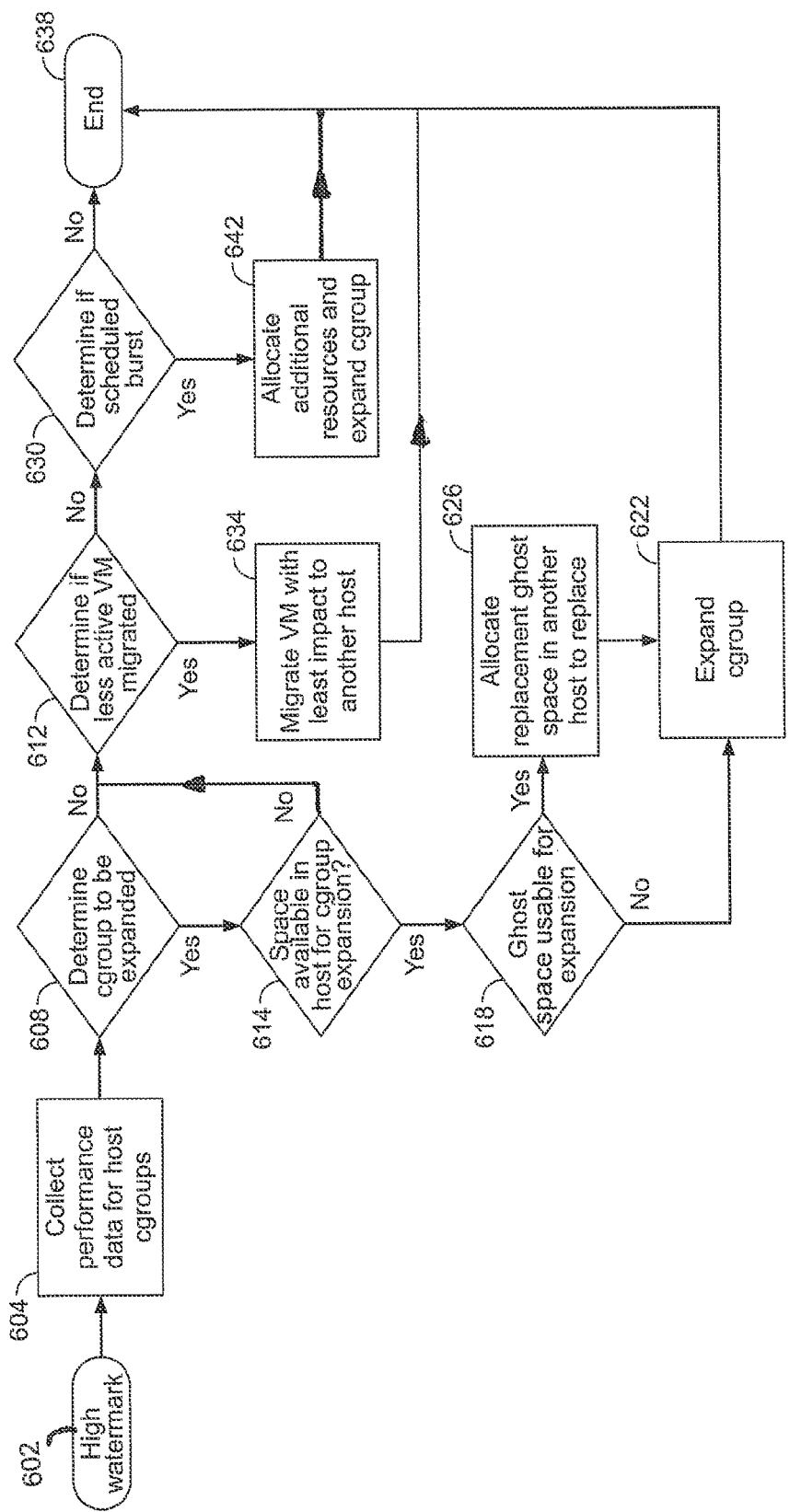
FIG. 6 is a flow diagram showing an illustrative process of resource management service provision according to a disclosed implementation.

FIG. 6 is a flow diagram showing an illustrative process of resource management service provisioning according to various implementations herein. Referring to FIG. 6, implementations relating to allocating and/or expanding cluster groups are disclosed. Upon receipt of a high watermark 602, for example, systems and methods herein may initially collect performance information for host cluster groups, at 604. Then, a determination may be made, at 608, as to whether a cluster group may be expanded to address the high watermark. If a cluster group suitable for expansion is identified, processing is performed, at 614, related to verifying whether space is available in the relevant host(s) for the cluster group expansion. In instances where no such host space is available, processing proceeds to 612, as explained below. If host space is available, then a determination may be made, at 618, as to whether existing ghost space can be used for the expansion. If such ghost space is unavailable, processing related to expanding the cluster group without ghost space manipulation is performed, at 622, and the method ends 638. If, at 618, a determination is made that ghost space is available on the relevant host(s) for expansion, a step of allocating replacement ghost space may be performed, at 626. Here, for example, replacement ghost space may be created in another host such that the ghost space on the subject host may be reallocated to the other host. Once the ghost space has been reallocated, processing may proceed to a step of expanding the cluster group into the replaced ghost space on the present cluster, at 622, and the method ends 638.

If the algorithm concludes, in steps 608 or 614, that no space is available for cluster group expansion, processing may proceed to determining if any less active virtual machines (VMs) may be migrated, at 612. If less active VMs are not available for migration, a determination may be made, at 630, as to whether a scheduled burst may be implemented to expand the cluster group. If such burst processing is not available for expansion, the method ends at 638. When such burst processing is available to expand the cluster group, processing proceeds to step 642, where additional burst resources are allocated and the cluster group is expanded, and thereafter the method ends 638. If, at 612, a determination is made that less active VMs suitable for migration to resolve the issue exist, instructions to migrate such VMs with least impact to another host may be processed, at 634. With the allocation issue resolved via migration of less active VMs, the method may end 638.

Turning back to some more general aspects, the management service that provides the functionality herein may be entirely or substantially stateless in that the cluster groups themselves provide the information relating to their own performance and to the performance of the virtual machines within them. To this end, various implementations of the management service can have various options such as (1) being configured to run outside the cluster, or (2) being configured to run inside of the cluster and be managed as a cluster resource. The benefits of option 1 are that such configuration(s) maintain a traditional management model. A single virtual machine, however, is then responsible for the maintenance of the entire cluster, and some form of management clustering may be included to promote continued operation of the single virtual machine.

The benefits to option 2 are that the cluster technology is already in place and the clusters may become largely self sustaining At any one time, however, one of the hosts would have the additional overhead of monitoring the cluster. In some implementations of a management service using option 2 and based on a distributed model, one server may be configured to monitor a customer's Cgroup alerts. Here, for example, upon receiving a Cgroup alert or responding to a timed event, the cluster can instruct a peer to carry out the maintenance of the task, which would offset the overhead of the procedure. Given that the resources of each customer is on a defined set of servers, this maintenance task could be allocated to the affected server(s). This can consequently generate an expected overhead and reduce management impact on other customers within the cluster. In other words, if the management service is run by a single management node (server), then any migration or resource re-allocation may generate an overhead on that server, and that server is a resource used by all other customers. If the management service or process is configured to execute on a specified host, then only customers on that host will share any processing overhead, and one of those customers will be the customer causing that overhead. In this regard, the management service may be implemented, at least in part, as a monitoring service/process (or application) and the monitoring service/process can be maintained solely as a monitoring process. In the event of a trigger event occurring, then the management service/process can spawn a customer-specific migration decision event or process on the host generating the trigger, and then the management service/process can return to its monitoring state. The customer-specific migration decision process can then proceed to evaluate the requirements and define a best fit resolution and enact that plan. Once customer-specific migration decision process is complete, the customer-specific migration decision process can expire. If any balance issue exists after the customer-specific migration decision process has performed its functions, the monitoring service/process can generate new customer-specific migration decision process(es) as appropriate; this should result in a per-customer iterative balance.

Figure 7:
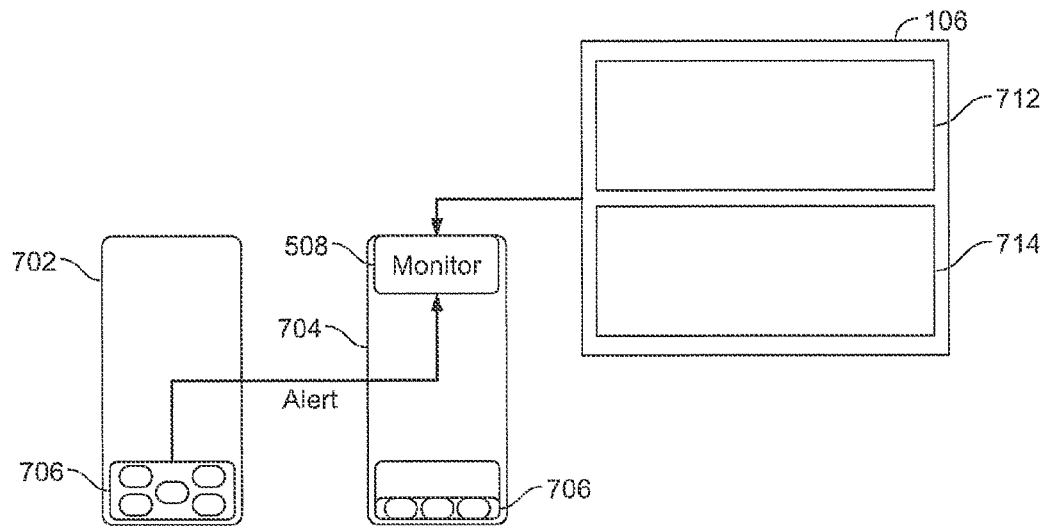
FIGS. 7-10 are diagrams illustrating exemplary aspects of resource management allocation features according to disclosed implementations.
Figure 8:
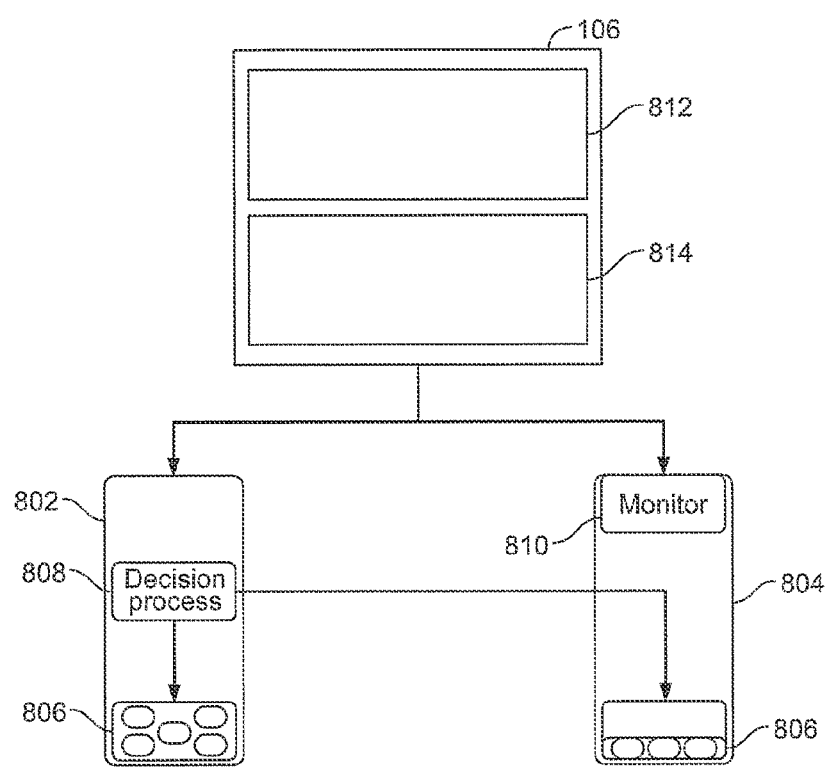
Figure 9:
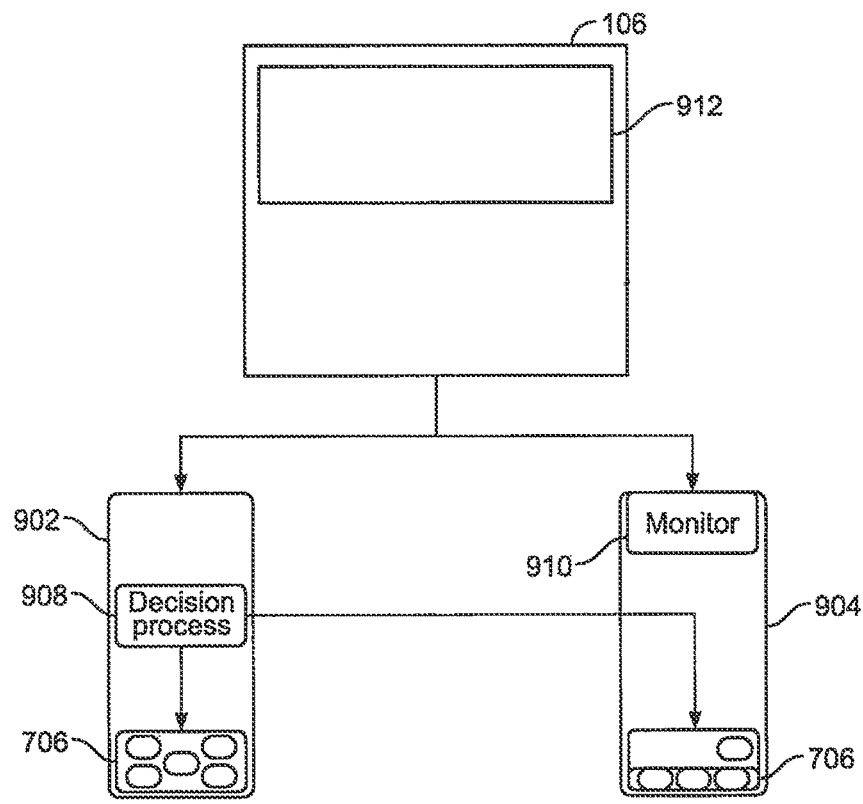
Figure 10:
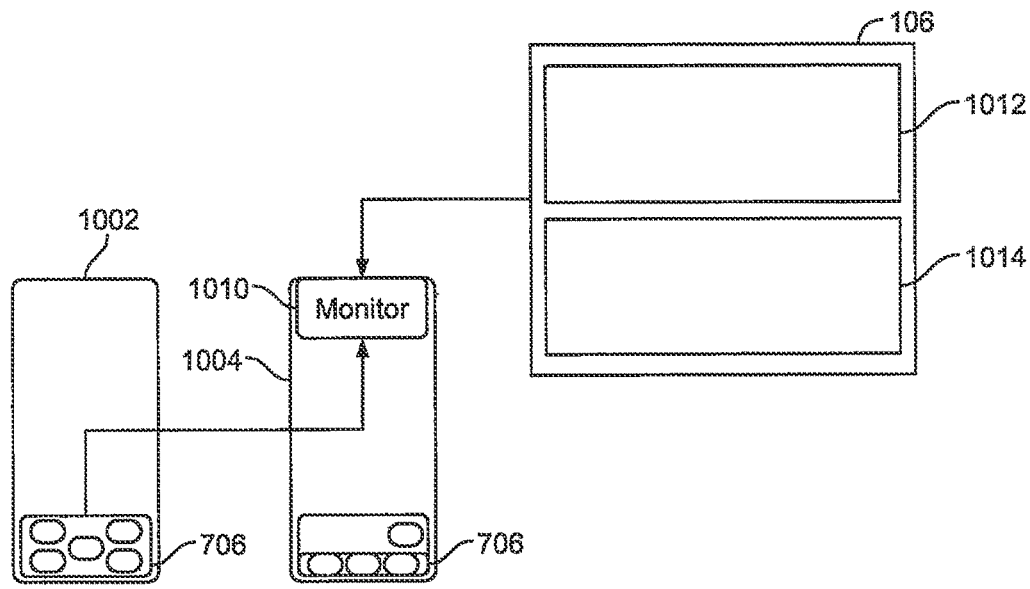

FIGS. 7-10 are diagrams illustrating exemplary aspects of resource management allocation features according to disclosed implementations. Referring to FIG. 7, a monitoring service/process 508 may be configured to run 712 on a host 704, where another host 702 generates 714 a high watermark alert 707. Then, as shown in FIG. 8, the monitoring service/process 508 generates or spawns 812*a* customer-specific migration decision process 808 on the affected host 702. This customer-specific migration decision process 808 may query the alternate pools and may make a "best fit" decision 814 on VM placement, etc. Next, as shown in FIG. 9, the customer-specific migration decision process 808 may generates a "Balance" migration 912 of a VM to an alternate Cgroup 911. Finally, as shown in FIG. 10, the balancing process is completed and the customer-specific migration decision process lapses.

It should be noted that the VM Cgroup allocation features herein may be implemented as an extension to the VM XML configuration file, and this may also extend into the open virtualization format (OVF) files, etc.

Figure 11:
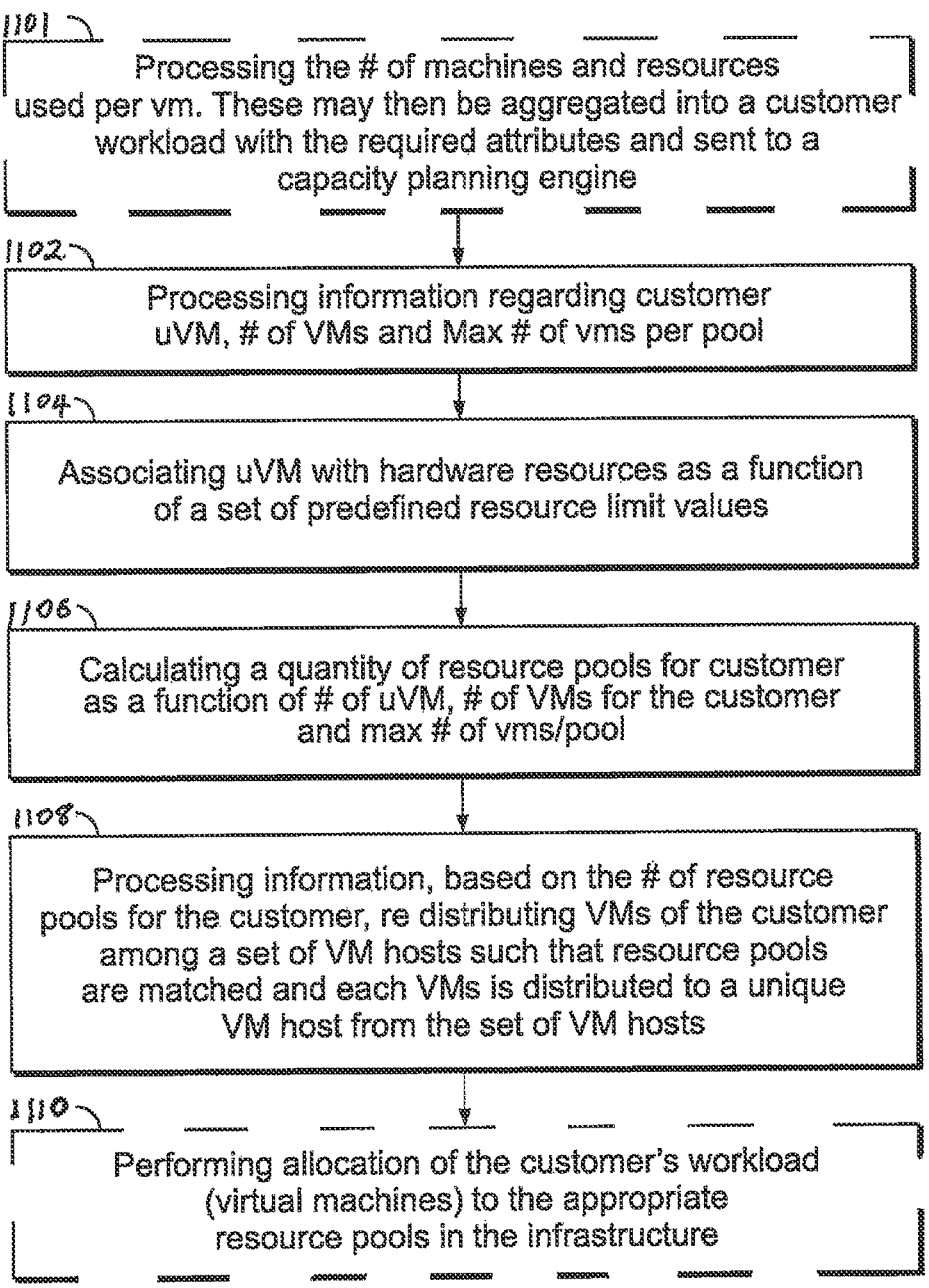
FIG. 11 is a flow diagram showing illustrative methods of resource management processing according to disclosed implementations.

FIG. 11 is a flow diagram showing illustrative methods of resource management processing according to disclosed implementations. Referring to the core steps of the implementation of FIG. 11, an illustrative method may include receiving or processing information regarding an indication of a number of infrastructure units for a customer, an indication of a number of virtual machines (VMs) for the customer, and/or an indication of a maximum number of VMs per resource pool 1102. Further, the method may include associating IUs for the customer with hardware resources managed as a function of a set of predefined resource limit values 1104. The method may also include calculating a number of resource pools for the customer based on the number of infrastructure units for the customer, the number of VMs for the customer, and/or the maximum number of VMs per resource pool 1106. Finally, the method may also include processing information (such as preparing, handling or sending a signal) based on the number of resource pools for the customer to cause VMs of the customer to be distributed among a set of VM hosts 1108, such that each resource pool for the customer is associated with VMs of the customer and is distributed to a unique VM host from the set of VM hosts.

FIG. 11 also illustrates several steps on the front and back of the method discussed above, namely steps 1101 and 1110. Referring to these optional features, another illustrative method may also include an initial step of processing the number of machines and resources used per virtual machine (VM) 1101. Here, for example, such determined information may then be aggregated into a customer workload with the required workload and sent to a capacity planning engine. The method may then proceed to the core steps of processing information regarding a number of infrastructure units (IUs) for a customer, an indication of a number of virtual machines (VMs) for the customer, and/or an indication of a maximum number of VMs per resource pool 1102; associating each infrastructure unit from the infrastructure units for the customer is associated with hardware resources managed based on a set of predefined resource limit values 1104; calculating a number of resource pools for the customer based on the number of infrastructure units (IUs) for the customer, the number of VMs for the customer, and/or the maximum number of VMs per resource pool 1106; and processing information, based on the number of resource pools for the customer, regarding distribution of VMs of the customer among a set of VM hosts such that each resource pool for the customer is associated with VMs of the customer and is distributed to a unique VM host from the set of VM hosts 1108. Finally, such method may also include a step of performing allocation of the customer's workload (VMs) to the appropriate resource pools in the infrastructure 1110.

In general, the innovations herein may be implemented via one or more components, systems, servers, appliances, other subcomponents, or distributed between such elements. When implemented as a system, such system may comprise, inter alia, components such as software modules, general-purpose CPU, RAM, etc. found in general-purpose computers, and/or FPGAs and/or ASICs found in more specialized computing devices. In implementations where the innovations reside on one or more servers, such servers may include or involve components such as CPU, RAM, etc., such as those found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where elements are connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Furthermore, aspects may be embodied in microprocessors having software-based circuit emulation, discrete logic (sequential and combinatorial), custom devices, fuzzy (neural) logic, quantum devices, and hybrids of any of the above device types.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The invention claimed is:

1. A method for processing information related to management of a cluster-based pool of resources comprising one or more clusters wherein each cluster comprises one or more hosts executing one or more virtual machines (VMs), the method comprising:

establishing a customer's resource requirement as a quantity of universal infrastructure units (IUs), wherein a universal infrastructure unit is defined as a function of processing speed and virtual machine memory size;

processing information regarding a quantity of infrastructure units for the customer, an indication of a number of virtual machines (VMs) for the customer, and an indication of a maximum number of VMs per cluster, the maximum number of VMs per cluster determined based on a ratio of a predefined outage time defined by a guaranteed level of service and migration or high availability time per virtual machine;

associating each infrastructure unit from the infrastructure units for the customer with hardware resources managed based on a set of predefined resource limit values assigned to the customer including operational parameters established for utilization of the customer's resources while allocated among the one or more clusters;

calculating a number of clusters for the customer based on the quantity of infrastructure units for the customer, the number of VMs for the customer and the maximum number of VMs per cluster; and processing information, based on the number of clusters for the customer, regarding distribution of VMs of the customer among a set of hosts of the one or more hosts such that each cluster for the customer is associated with VMs of the customer and is distributed to a unique host from the set of hosts.

2. The method of claim 1 further comprising:
analyzing clusters configured to hold customer data including performing speed testing and VM memory map sizing of hosts.

3. The method of claim 1 further comprising:
aggregating customer workload attributes; and
sending the aggregated information to a capacity planning engine or process.

4. The method of claim 1 further comprising:
performing allocation of a workload of the customer to the unique distribution of clusters in the cluster-based pool of resources.

* * * * *

UNITED STATES PATENT AND TRADEMARK OFFICE
CERTIFICATE OF CORRECTION

PATENT NO. : 9,535,752 B2
APPLICATION NO. : 14/318251
DATED : January 3, 2017
INVENTOR(S) : Vincent G. Lubsey et al.

Page 1 of 1

It is certified that error appears in the above-identified patent and that said Letters Patent is hereby corrected as shown below:

On the Title Page

Please change the city of residence for inventor Kevin D. Reid from "Bethesday" to --Bethesda--

In the Specification

Column 9, Line 58 delete "sustaining $\Delta t$" and replace it with --sustaining. At--

Column 10, Line 36 delete "812$a$" and replace it with --812 a--

Signed and Sealed this
Twenty-first Day of February, 2017

Michelle K. Lee
*Director of the United States Patent and Trademark Office*